United States Patent
Chao et al.

(10) Patent No.: US 11,259,052 B2
(45) Date of Patent: Feb. 22, 2022

(54) TRANSFORM VARIATIONS OF MULTIPLE SEPARABLE TRANSFORM SELECTION

(71) Applicant: QUALCOMM Incorporated, San Diego, CA (US)

(72) Inventors: Yung-Hsuan Chao, San Diego, CA (US); Amir Said, San Diego, CA (US); Hilmi Enes Egilmez, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/511,927

(22) Filed: Jul. 15, 2019

(65) Prior Publication Data

US 2020/0021852 A1 Jan. 16, 2020

Related U.S. Application Data

(60) Provisional application No. 62/698,795, filed on Jul. 16, 2018.

(51) Int. Cl.
*H04N 19/625* (2014.01)
*H04N 19/61* (2014.01)
*H04N 19/20* (2014.01)

(52) U.S. Cl.
CPC ........... *H04N 19/625* (2014.11); *H04N 19/20* (2014.11); *H04N 19/61* (2014.11)

(58) Field of Classification Search
CPC .... H04N 19/12; H04N 19/136; H04N 19/159; H04N 19/176; H04N 19/20; H04N 19/61; H04N 19/625
See application file for complete search history.

(56) References Cited

U.S. PATENT DOCUMENTS

| 6,683,997 B1 * | 1/2004 | Yoshio | G06T 3/4084 |
| | | | 382/232 |
| 2007/0071096 A1 * | 3/2007 | Chen | H04N 19/107 |
| | | | 375/240.12 |

(Continued)

FOREIGN PATENT DOCUMENTS

| CA | 3082756 | * 11/2018 | H04N 19/60 |
| JP | 2017-226062 | * 11/2017 | H04N 19/60 |

OTHER PUBLICATIONS

Lorcy et al. "Proposed improvments to the Adaptive Multiple Core Transform" JVET, May 27, 2016.*

(Continued)

*Primary Examiner* — James T Boylan
(74) *Attorney, Agent, or Firm* — Shumaker & Sieffert, P.A.

(57) ABSTRACT

This disclosure describes examples of extending the number of available discrete cosine transform (DCT) and discrete sine transform (DST) for encoding and decoding. A video coder may determine one or more transforms or inverse transforms to apply from a set of transforms or inverse transforms that includes DCT-2 or inverse DCT-2, DST-7 or inverse DST-7, DST-8 or inverse DST-8, DCT-3 or inverse DCT-3, DST-2 or inverse DST-2, DST-3 or inverse DST-3, DCT-4 or inverse DCT-4, DST-4 or inverse DST-4, DST-5 or inverse DST-5, DST-6 or inverse DST-6, and identity transform an inverse identity transform (IDT).

8 Claims, 10 Drawing Sheets

(56) References Cited

U.S. PATENT DOCUMENTS

| | | | | |
|---|---|---|---|---|
| 2012/0121167 | A1* | 5/2012 | Atoyan | G06F 17/175 |
| | | | | 382/154 |
| 2016/0219290 | A1* | 7/2016 | Zhao | H04N 19/109 |
| 2018/0020218 | A1* | 1/2018 | Zhao | H04N 19/176 |
| 2018/0103252 | A1* | 4/2018 | Hsieh | H04N 19/176 |
| 2018/0262777 | A1* | 9/2018 | Filippov | H04N 19/12 |
| 2018/0332289 | A1* | 11/2018 | Huang | H04N 19/186 |
| 2020/0014924 | A1* | 1/2020 | Zhao | H04N 19/176 |
| 2020/0280740 | A1* | 9/2020 | Tsukuba | H04N 19/12 |
| 2020/0296370 | A1* | 9/2020 | Egilmez | H04N 19/61 |
| 2021/0218996 | A1* | 7/2021 | Koo | H04N 19/85 |

OTHER PUBLICATIONS

Family Search Results from STIC Translation Department.*
Biatek T., et al., "Low-Complexity Adaptive Multiple Transforms for post-HEVC Video Coding", 2016 Picture Coding Symposium (PCS), IEEE, Dec. 4, 2016, XP033086858, DOI: 10.1109/PCS. 2016.7906348 [retrieved on Apr. 19, 2017] Sections I, II, III; tables I-IV, pp. 1-5.
Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 400 pp.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Ergen S., "ZigBee/IEEE 802.15.4 Summary", Sep. 10, 2004, 37 pp.
Han J., et al., "Towards jointly optimal spatial prediction and adaptive transform in video/image coding," IEEE International Conference on Acoustics, Speech and Signal Processing (ICASSP), pp. 726-729 (Mar. 2010).
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/04203—ISA/EPO—dated Sep. 20, 2019 (16 pp).
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Jain A.K., "A sinusoidal family of unitary transforms", IEEE Transactions on Pattern Analysis and Machine Intelligence, Oct. 1, 1979, pp. 356-365, IEEE Service Center, XP011242370, ISSN: 0162-8828.
Lorcy V., et al., "Proposed Improvements to the Adaptive Multiple Core Transform", 3rd JVET Meeting, Joint Video Exploration Team (JVET) of ITU-T SG 16 WP 3 and ISO/IEC JTC 1/SC 29/WG 11, JVET-C0022-v4, May 26, 2016-Jan. 6, 2016, May 27, 2016, URL: http://phenix.int-evry.fr/jvet/,No. JVET-C0022-v4, XP030150104, 4 pages.
Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html; [Retrieved on Feb. 9, 2017].
Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.
Wien M, "High Efficiency Video Coding, Coding Tools and specification", Chapter 5, 2015, pp. 133-160.

* cited by examiner

TRANSFORM VARIATIONS OF MULTIPLE SEPARABLE TRANSFORM SELECTION

This application claims the benefit of U.S. Provisional Application No. 62/698,795, filed Jul. 16, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for transform coding including variations of multiple separable transform selection (MSTS) designs. In some video coding techniques for transform coding, in addition to discrete cosine transform (DCT)-2, another two transforms, discrete sine transform (DST)-7 and DCT-8, are both employed for separable transform. However, limiting additional transforms to only DST-7 and DCT-8 may unnecessarily exclude transforms that provide more flexibility on top of MSTS with competitive computation complexity and memory usage. This disclosure describes techniques to include additional transforms (e.g., in addition to DST-7 and DCT 8, or as alternatives to, i.e., excluding, DST-7 and DCT-8) for transform coding that may not increase computation complexity and memory usage relative to techniques that limit transforms to DCT-2, DST-7, and DCT-8.

In one example, the disclosure describes a method of decoding video data, the method comprising determining one or more inverse transforms to apply from a set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT), applying the determined one or more inverse transforms to coefficient values representing a residual block to generate the residual block, and reconstructing a current block based on the residual block and a predictive block.

In one example, the disclosure describes a method of encoding video data, the method comprising determining one or more transforms to apply from a set of transforms that includes discrete cosine transforms (DCTs) and discrete sine transforms (DSTs), wherein the set of transforms includes DCT-2, DST-7, DST-8, DCT-3, DST-2, DST-3, DCT-4, DST-4, DST-5, DST-6, and an identity transform (IDT), applying the determined one or more transforms to sample values representing a residual block of a current block to generate a coefficient block, and signaling video data indicative of the coefficient block.

In one example, the disclosure describes a device for decoding video data, the device comprising a memory configured to store information for a predictive block and a video decoder comprising at least one of fixed-function or programmable circuitry. The video decoder is configured to determine one or more inverse transforms to apply from a set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT), apply the determined one or more inverse transforms to coefficient values representing a residual block to generate the residual block, and reconstruct a current block based on the residual block and a predictive block.

In one example, the disclosure describes a computer-readable storage medium storing instructions thereon that when executed cause one or more processors of a device for decoding video data to determine one or more inverse transforms to apply from a set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT), apply the determined one or more inverse transforms to coefficient values representing a residual block to generate the residual block, and reconstruct a current block based on the residual block and a predictive block.

The details of one or more examples are set forth in the accompanying drawings and the description below. Other features, objects, and advantages will be apparent from the description, drawings, and claims.

DETAILED DESCRIPTION

This disclosure is related to transform coding, which is an element of all modern video compression standards, such as those described in M. Wien, *High Efficiency Video Coding: Coding Tools and Specification*, Springer-Verlag, Berlin, 2015. Examples of the transform coding include variations of the multiple separable transform selection (MSTS) designs adopted in the Versatile Video Coding (VVC) standard. In VVC, in addition to DCT-2, which has been used in the High Efficiency Video Coding (HEVC) standard, another two transforms, i.e., DST-7 and DCT-8, are both employed for separable transform. However, the method may not consider other alternatives which provide more flexibility on top of MSTS with competitive computation complexity and memory.

Figure 1:
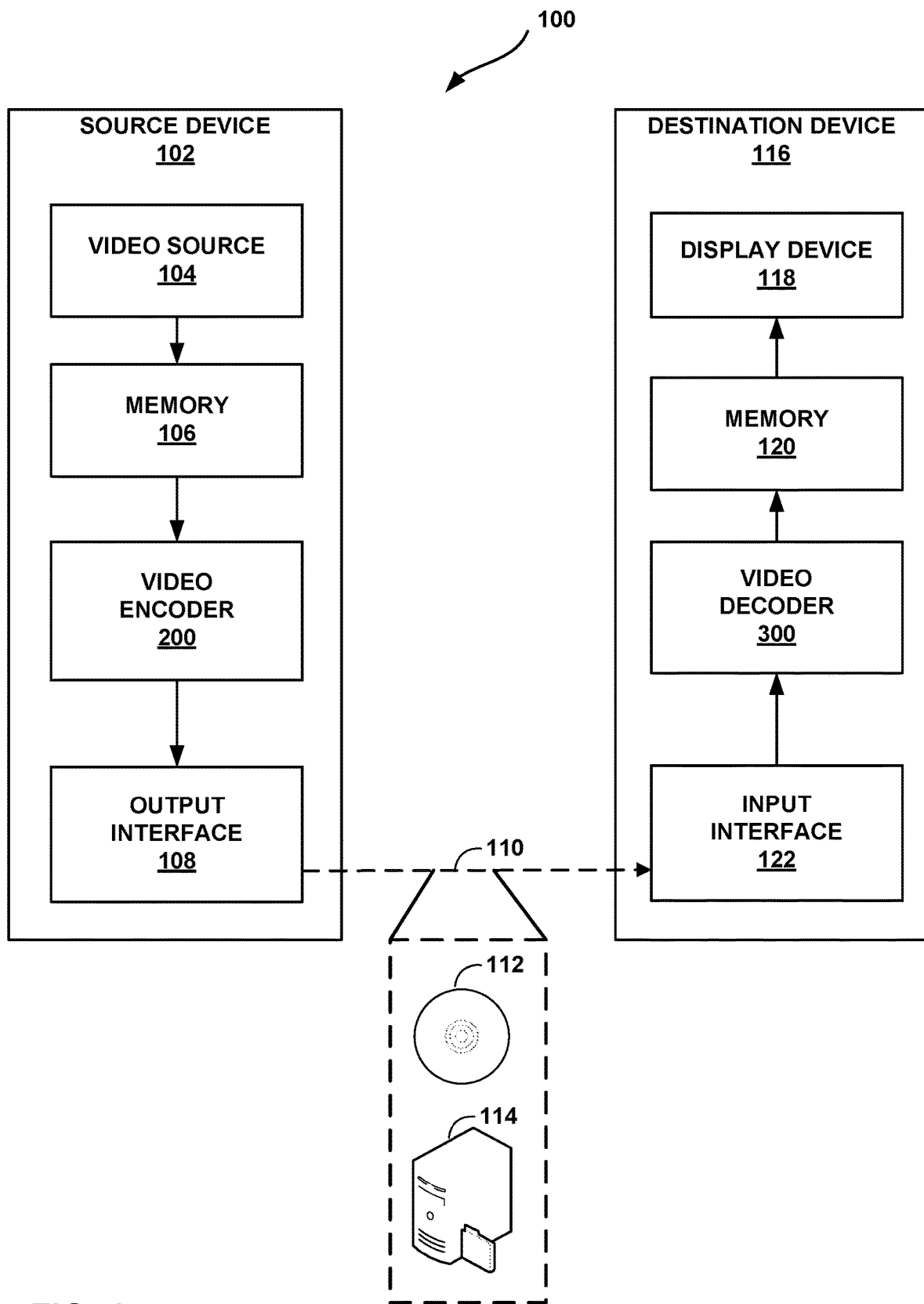
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for transform variations of multiple separable transform selection. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for transform variations of multiple separable transform selection. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM or VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM or VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM or VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding inter-prediction mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to perform transform of samples representing a residual block or inverse transform of a coefficient block, respectively, using the techniques described in this disclosure. In the use of a separable transform, video encoder 200 applies a first transform to block of sample values representing residual data to produce an intermediate block, and then applies a second transform to the intermediate block generated from application of the first transform to generate a coefficient block. Video decoder 300 performs similar operations but with inverse transforms. For instance, video decoder 300 may apply a first inverse transform to a coefficient block, and apply a second inverse transform to the intermediate block generated from application of the first inverse transform to generate a residual block.

Some other techniques limit the types of transforms and inverse transforms that are available based on an assumption that the excluded transforms or inverse transforms are too complex or utilize too much memory space. However, excluding certain types of transforms may negatively impact coding gains. Accordingly, this disclosure describes example techniques where additional transforms or inverse transforms (in addition to or excluding transforms used in these other techniques) are applied that may not increase complexity or memory usage compared to these other techniques.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Furthermore, this disclosure may refer to term transform. When the term transform is used, the term is referring to video encoding. Video decoding is the inverse of the video encoding, and therefore, applies inverse transforms. Accordingly, in this disclosure, when the application of transforms is described, the inverse of the application of the transforms is performed as part of video decoding.

Figure 2A:
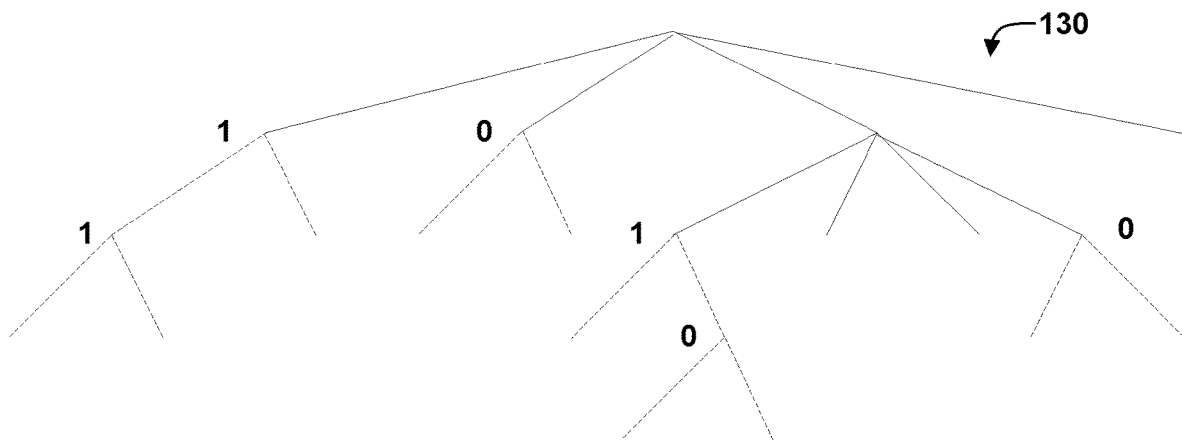
FIGS. 2A and 2B are conceptual diagrams illustrating an example quadtree binary tree (QTBT) structure, and a corresponding coding tree unit (CTU).
Figure 2B:
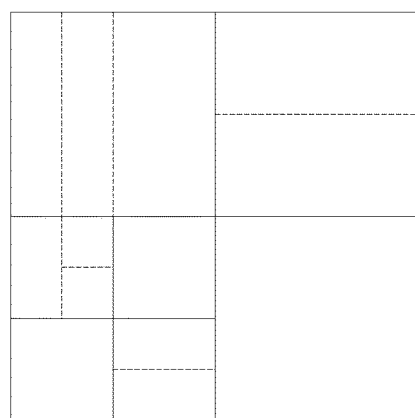

FIGS. 2A and 2B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node may not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

The following present an overview on discrete sine and cosine transforms (DCTs and DSTs). Also, the transform scheme used in the HEVC standard is briefly discussed.

Transform indicates the process of deriving an alternative representation of the input signal. Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \sum_{i=0}^{M-1} f_i \Phi_i$$

where $\hat{x}$ can be an approximation or equivalent of x, vector $f=[f_1, f_2, \ldots, f_{M-1}]$ is called the transform coefficient vector and $\{\Phi_0, \Phi_1, \ldots, \Phi_{M-1}\}$ are the transform basis vectors.

In the scenario of video coding, transform coefficients are roughly non-correlated and sparse, i.e., the energy of the input vector x is compacted only on a few transform coefficients, and the remaining majority transform coefficients are typically close to 0.

Given the specific input data, the optimal transform in terms of energy compaction is the so-called Karhunen-Loeve transform (KLT), which uses the eigen vectors of the covariance matrix of the input data as the transform basis vectors. Therefore, KLT is actually a data-dependent transform and does not have a general mathematical formulation. However, under certain assumptions, e.g., the input data forms a first-order stationary Markov processes, it has been proved in the literature that the corresponding KLT is actually a member of the sinusoidal family of unitary transforms, which is introduced in Jain, A. K., A sinusoidal family of unitary transforms, IEEE Trans. on Pattern Analysis and Machine Intelligence, 1, 356, 1979. The sinusoidal family of unitary transforms indicates transforms using transform basis vectors formulated as follows:

$$\Phi m(k) = A \cdot e^{ik\theta} + B \cdot e^{-ik\theta}$$

where e is the base of the natural logarithm approximately equal to 2.71828, A, B, and θ are complex in general, and depend on the value of m.

Several well-known transforms including the discrete Fourier transform, cosine transform, sine transform, and the KLT (for first-order stationary Markov processes) are members of this sinusoidal family of unitary transforms. According to S. A. Martucci, "Symmetric convolution and the discrete sine and cosine transforms," IEEE Trans. Sig. Processing SP-42, 1038-1051 (1994), the complete set of discrete cosine transform (DCT) and discrete sine transform (DST) families includes totally 16 transforms based on different types, i.e., different values of A, B, and θ, and a complete definition of the different types of DCT and DST is given below.

Assume the input N-point vector is denoted as $x = [x_0, x_1, \ldots, x_{N-1}]^T$, and it is transformed to another N-point transform coefficient vector denoted as $y = [y_0, y_1, \ldots, y_{N-1}]^T$ by multiplying a matrix, the process of which can be further illustrated according to one of the following transform formulations, where k ranges from 0 through N−1, inclusive:

*DCT* Type-I (*DCT*-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $w_0 = \begin{cases} \frac{1}{\sqrt{2}}, & \text{if } n = 0 \text{ or } n = N-1 \\ 1, & \text{otheriwse} \end{cases}$, $w_1 = \begin{cases} \frac{1}{\sqrt{2}}, & \text{if } k = 0 \text{ or } k = N-1 \\ 1, & \text{otheriwse} \end{cases}$

*DCT* Type-II (*DCT*-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $w_0 = \begin{cases} \frac{1}{\sqrt{2}}, & \text{if } k = 0 \\ 1, & \text{otheriwse} \end{cases}$

*DCT* Type-III (*DCT*-3):

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

where $w_0 = \begin{cases} \frac{1}{\sqrt{2}}, & \text{if } n = 0 \\ 1, & \text{otheriwse} \end{cases}$

*DCT* Type-IV (*DCT*-4):

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

*DCT* Type-V (*DCT*-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = 0 \\ 1, & \text{otheriwse} \end{cases}$

*DCT* Type-VI (*DCT*-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = 0 \\ 1, & \text{otheriwse} \end{cases}$

*DCT* Type-VII (*DCT*-7):

$$y_k = \sum_{n=0}^{N-1} \sqrt{\frac{2}{N-0.5}} \cos\left(\frac{\pi \cdot n \cdot (k+0.5) \cdot}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$

*DCT* Type-VIII (*DCT*-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

*DST* Type-I (*DST*-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

-continued

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otheriwse} \end{cases}$ DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otheriwse} \end{cases}$ DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n.$$

DST Type-VII (DST-7):

$$y_k = \sum_{n=0}^{N-1} \sqrt{\frac{2}{N-0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ The transform type is specified by the mathematical formulation of the transform basis function, e.g., 4-point DST-VII and 8-point DST-VII have the same transform type, regardless of the value of N.

Without loss of generality, all the above transform types can be represented using the below generalized formulation:

$$y_m = \sum_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors.

A transform applied on the N-point input vector is called an N-point transform. It is also noted that, the above transform formulations, which are applied on the 1-D input data x, can be represented in matrix multiplication form as below $$y = T \cdot x$$

where T indicates the transform matrix, x indicates the input data vector, and y indicates the output transform coefficients vector.

The following describes transform for 2-Dimensional (2-D) input data. The transforms as introduced above are applied on 1-D input data, and transforms can be also extended for 2-D input data sources. Supposing X is an input M×N data array, the typical methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

where C and R denote the given M×M and N×N transform matrices, respectively.

From the formulation, it can be seen that C applies 1-D transforms for the column vectors of X, while R applies 1-D transforms for the row vectors of X. In the later part of this disclosure, for simplicity denote C and R as left (vertical) and right (horizontal) transforms and they both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X'_{(i \cdot N + j)} = X_{i,j}$$

Then a 1-D transform T' is applied for X' as below:

$$Y = T' \cdot X$$

where T' is an (M*N)×(M*N) transform matrix.

In video coding, separable 2-D transforms may always be applied since it may require much less operation (addition, multiplication) counts as compared to 1-D transform.

The following describes transform types applied in HEVC. In conventional video codecs, such as H.264/AVC, an integer approximation of the 4-point and 8-point Discrete Cosine Transform (DCT) Type-II is always applied for both Intra and Inter prediction residual. To better accommodate the various statistics of residual samples, more flexible types of transforms other than DCT Type-II are utilized in the new generation video codec. For example, in HEVC, an integer approximation of the 4-point Type-VII Discrete Sine Transform (DST) is utilized for Intra prediction residual, which is both theoretically proved and experimentally validated (see J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729) that DST Type-VII is more efficient than DCT Type-II for residuals vectors generated along the Intra prediction directions, e.g., DST Type-VII is more efficient than DCT Type-II for row residual vectors generated by the horizontal Intra prediction direction. In HEVC, an integer approximation of 4-point DST Type-VII is applied only for 4×4 luma Intra prediction residual blocks.

The following describes a transform scheme based on residual quadtree in HEVC. To adapt the various characteristics of the residual blocks, a transform coding structure using the residual quadtree (RQT) is applied in HEVC, which is briefly described as following (see http://www.hhi.fraunhofer.de/fields-of-competence/image-processing/research-groups/image-video-coding/hevc-high-efficiency-video-coding/transform-coding-using-the-residual-quadtree-rqt.html).

Each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

Figure 3:
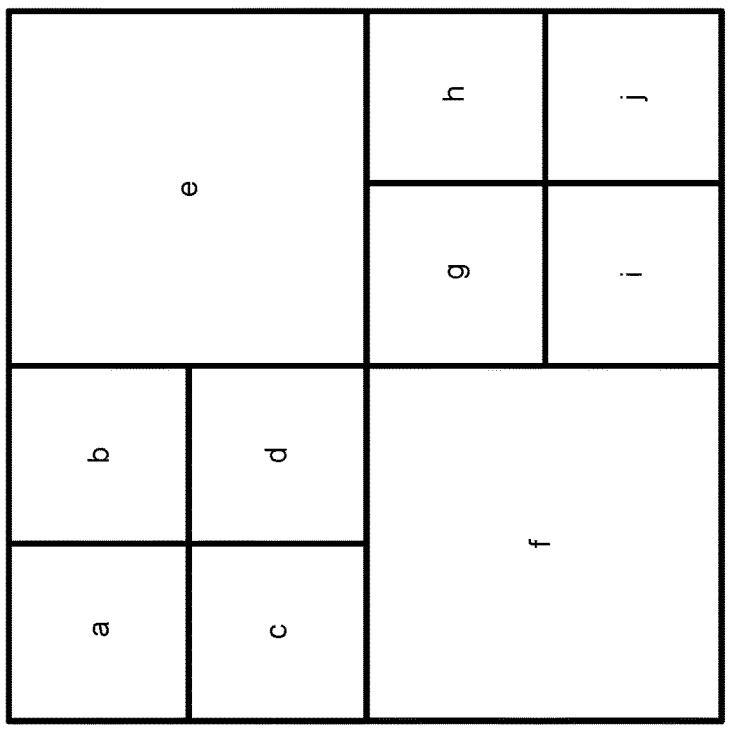
FIG. 3 is a conceptual diagram illustrating a transform scheme based on a residual quadtree structure in High Efficiency Video Coding (HEVC).
Figure 3:
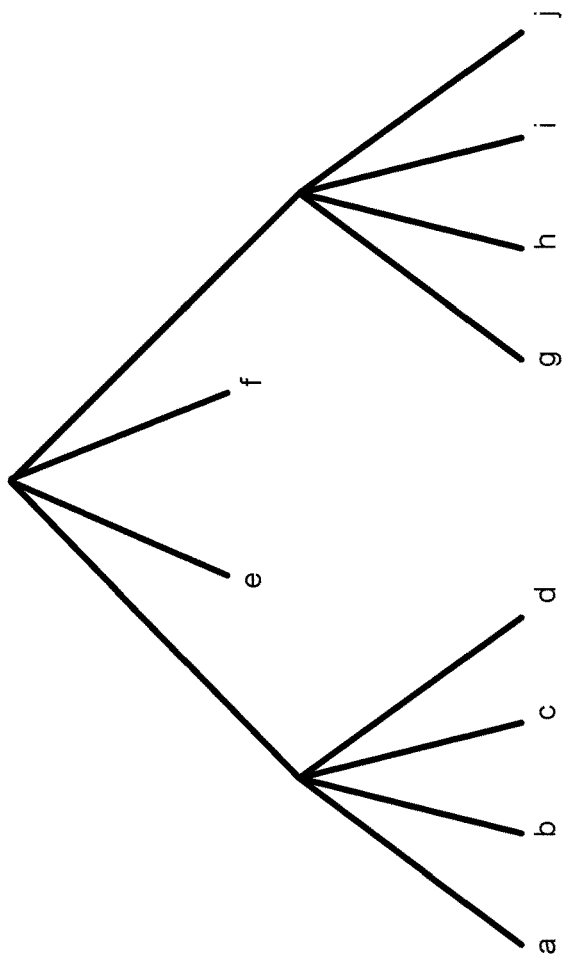

FIG. 3 shows an example where a CU includes 10 TUs, labeled with the letters a to j, and the corresponding block partitioning. Each node of the RQT is actually a transform unit (TU). The individual TUs are processed in depth-first tree traversal order, which is illustrated in the figure as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by video encoder 200 or video decoder 300 mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and selects the coding mode with least rate-distortion cost as the best mode.

Three parameters are defined in the RQT: the maximum depth of the tree, the minimum allowed transform size, and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB cannot be split any further if each included TB reaches the maximum allowed transform size, e.g., 32×32.

All these parameters interact and influence the RQT structure. Consider a case, in which the root CB size is 64×64, the maximum depth is equal to zero and the maximum transform size is equal to 32×32. In this case, the CB has to be partitioned at least once, since otherwise it would lead to a 64×64 TB, which is not allowed. The RQT parameters, i.e., maximum RQT depth, minimum and maximum transform size, are transmitted in the bitstream at the sequence parameter set level. Regarding the RQT depth, different values can be specified and signaled for intra and inter coded CUs.

The quadtree transform is applied for both Intra and Inter residual blocks. Typically the DCT-II transform of the same size of the current residual quadtree partition is applied for a residual block. However, if the current residual quadtree block is 4×4 and is generated by Intra prediction, the above 4×4 DST-VII transform is applied.

In HEVC, larger size transforms, e.g., 64×64 transform are not adopted mainly due to its limited benefit considering and relatively high complexity for relatively smaller resolution videos.

Figure 4:
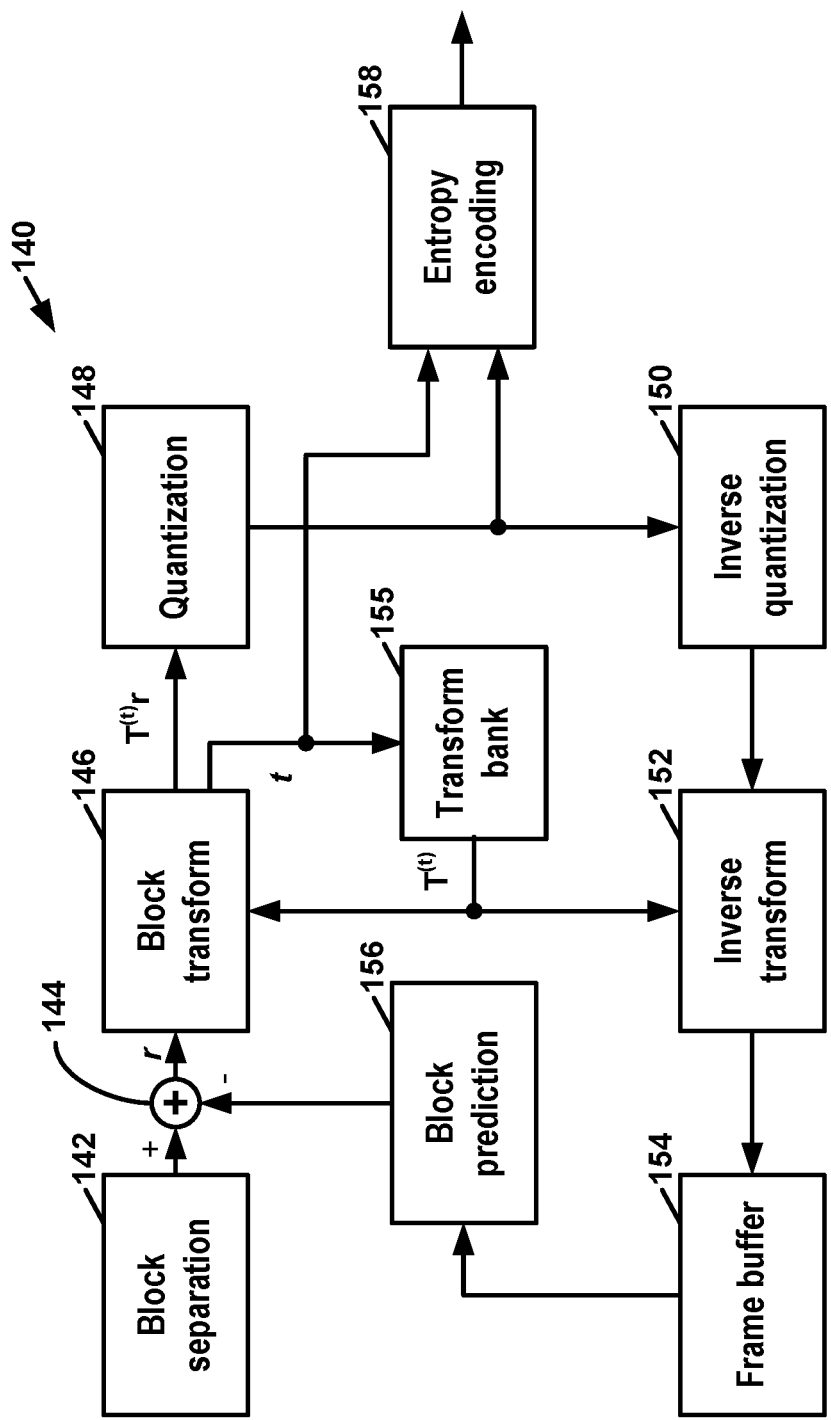
FIG. 4 is a block diagram illustrating an example system for hybrid video encoding with transform selection.

FIG. 4 is a block diagram illustrating an example system for hybrid video encoding with transform selection. The disclosure is applicable to a typical adaptive transform coding scheme shown in FIG. 4, where for each block of prediction residuals, different transforms can be chosen by video encoder 200, and the choice of transform is encoded as side information for signaling.

As illustrated, FIG. 4 shows a diagram of a video encoding system (i.e., a video encoder, such as video encoder 200), where video frames are first divided into pixel blocks (block separation 142). Example types of pixel blocks may include coding blocks for CUs. Furthermore, in FIG. 4, in each block, the video encoder subtracts each pixel value from its predicted value (144). The video encoder may numerically transform the blocks of differences (i.e., residuals) using a linear operation (block transform 146). In the example of FIG. 4, r denotes residual data, $T^{(t)}r$ denotes transformed residual data, and t denotes an indication of which transform was applied to the residual to generate $T^{(t)}r$. Transform bank 155 stores equations or information for different types of transforms, and block transform 146 applies the transform (e.g., $T^{(t)}$) based on a transform selected from transform bank 155.

In FIG. 4, the video encoder may quantize the transformed residual data (quantization 148) and inverse quantize (inverse quantization 150) the quantized transformed residual data. Furthermore, the video encoder may apply an inverse transform to the inverse quantized transformed residual data (inverse transform 152) to recover the residual data. A frame buffer 154, also called a decoded picture buffer (DPB), of the video encoder stores reconstructed pixel blocks determined based on the residual data. The video encoder may use reconstructed pixel blocks stored in frame buffer 154 for prediction of other pixel blocks (block prediction 156). In the example of FIG. 4, the inverse transform applied to the transformed residual data by the video encoder may be determined based on the transform previously applied to generate the transformed residual data. The indication of which transform was applied to generate the transformed residual data may be provided to an entropy encoding unit 158 of the video encoder. The entropy encoding unit 158 may entropy encode a syntax element indicating the transform along with syntax elements indicating the quantized transformed residual data.

Figure 5A:
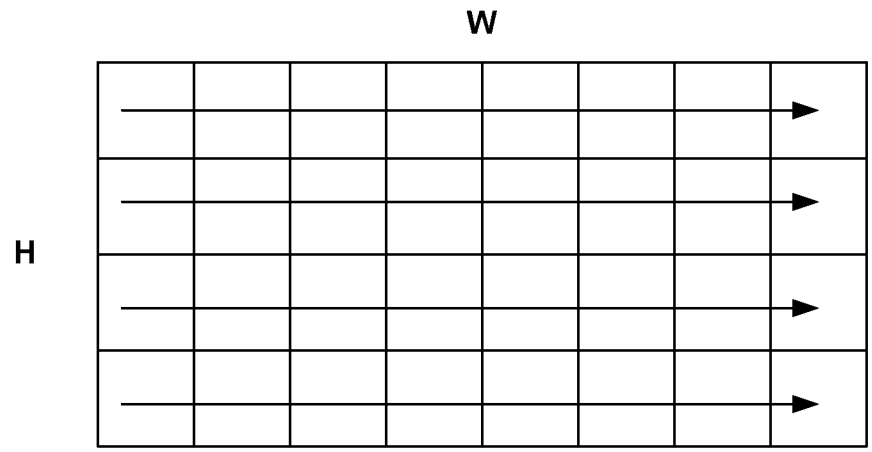
FIGS. 5A and 5B are conceptual diagrams illustrating separable transform implementation where horizontal and vertical lines are transformed independently.
Figure 5B:
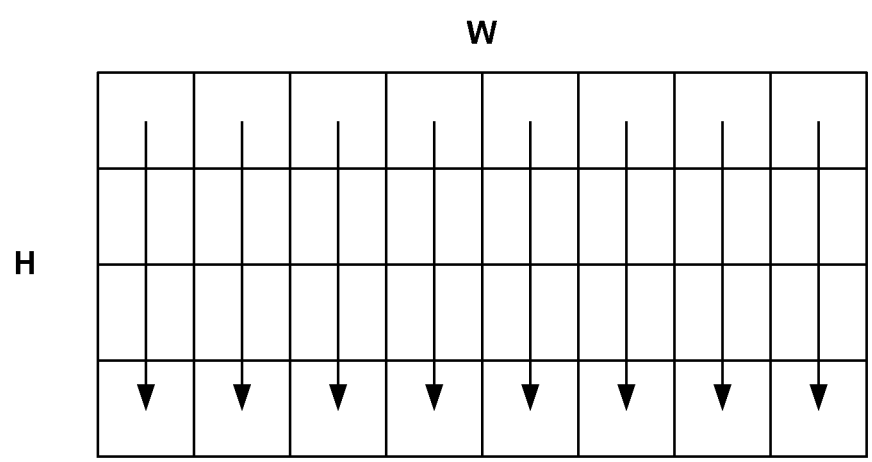

FIGS. 5A and 5B are conceptual diagrams illustrating separable transform implementation where horizontal and vertical lines are transformed independently. For instance, in practice, to reduce computational complexity the block transforms are commonly computed in a separable manner, i.e., the horizontal and vertical lines are transformed independently, as shown in FIGS. 5A and 5B. For instance, video encoder 200 may apply the example operations of FIG. 4 on the horizontal lines, as shown in FIG. 5A, and apply the example operations of FIG. 4 on the vertical lines of the resulting block, as shown in FIG. 5B.

In video coding standards prior to HEVC, only a fixed separable transform is used where DCT-2 is used both vertically and horizontally. In HEVC, in addition to DCT-2, DST-7 is also employed for 4×4 blocks as a fixed separable transform. In the discussion of a next generation video coding standard, Versatile Video Coding (VVC), DST-7 and DCT-8 are employed for block sizes up to 32×32, while DCT-2 is employed up to block size 64×64. For signaling, one flag is signaled indicating whether DCT-2 is employed for both horizontal and vertical directions. If DCT-2 is not applied in both directions, one flag is signaled indicating which transform out of DST-7 and DCT-8 is chosen to be applied in horizontal direction and one flag is signaled indicating which transform out of DST-7 and DCT-8 is chosen to be applied in vertical direction. The method described in the design of VVC is called Multiple Separable Transform Selection (MSTS).

There may be certain technical issues with existing techniques. In the current design of MSTS, only two transforms, DST-7 and DCT-8 are included on top of DCT-2. If MSTS is enabled, video encoder 200 can choose between DST-7 and DCT-8 in horizontal and vertical directions separately. The decision was mainly due to the concern of computation complexity and memory. However, the current design fails to consider other types of transform variations and applications, which can provide coding efficiency without increasing the computation complexity and memory from the current adoption.

This disclosure describes variations of the transform kernel design and application to the current MSTS, which may not increase computation complexity nor memory. Given a transform matrix T, some relationships are defined by matrix transposition, which corresponds to the inverse transform, since all the Discrete Trigonometric Transforms are defined to be orthogonal, and by the "reflection" operations FTS and STF, where F and S are orthogonal involutory matrices (an involutory matrix is its own inverse) defined by section 4.2 of J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729.

$$F_{m,n} = \begin{cases} 1, & \text{if } n = N - 1 - m, \\ 0, & \text{otherwise}, \end{cases}$$

$$S_{m,n} = \begin{cases} (-1)^m, & \text{if } n = m, \\ 0, & \text{otherwise} \end{cases}.$$

TABLE 1

| T | T$^t$ | FTS | STF | F T$^t$ S | S T$^t$ F |
|---|---|---|---|---|---|
| T$^{(C2)}$ | T$^{(C3)}$ | T$^{(S2)}$ | T$^{(C2)}$ | T$^{(C3)}$ | T$^{(S3)}$ |
| T$^{(S7)}$ | T$^{(S6)}$ | T$^{(S5)}$ | T$^{(C8)}$ | T$^{(C8)}$ | T$^{(S5)}$ |
| T$^{(C8)}$ | T$^{(C8)}$ | T$^{(S6)}$ | T$^{(S7)}$ | T$^{(S6)}$ | T$^{(S7)}$ |
| T$^{(C4)}$ | T$^{(C4)}$ | T$^{(S4)}$ | T$^{(S4)}$ | T$^{(S4)}$ | T$^{(S4)}$ |

Stated another way, F refers to flipping a 1D vector of values (e.g., residual values for encoding or coefficient values for decoding). The filling operation includes replacing the first value of the 1D vector with the last value of the 1D vector, and the last value of the 1D vector with the first value of the 1D vector, replacing the second value of the 1D vector with the second to last value of the 1D vector, and the second to last value of the 1D vector with the second value of the 1D vector, and so forth. S refers to sign change, and in some examples, the sign is changed for every odd value or entry in the 1D vector. Accordingly, FTS means sign change first, transform, and then flip (from right to left as in matrix multiplication). STF means flip first, transform, and then sign change.

As shown in Table 1, kernels of trigonometric transforms including DCT-3, DST-2, DST-3, DST-5, and DST-6 can be derived by simple reflection, sign changes, and transpose of DCT-2, DST-7, and DCT-8, the transforms that are currently adopted in VVC. The inclusion of these transforms provides flexibility and potential coding efficiency with no additional memory cost nor increase in the number of operations required. Besides, in the current implementation of DCT-2 in HEVC, a partial butterfly configuration is employed. For a N dimensional DCT-2 butterfly circuit, the circuit of N/2× N/2 DCT-4 is also embedded. Therefore, including DCT-4 in the selection of primary transform will not increase the cost of memory and the complexity in hardware implementation.

The first column of Table 1 identifies the DCT-2 (e.g., T$^{(C2)}$), DST-7 (e.g., T$^{(S7)}$), DCT-8 (e.g., T$^{(C8)}$), and DCT-4 (e.g., T$^{(C4)}$). As shown in Table 1, reading across the first row, DCT-3 (e.g., T$^{(C3)}$) is a transpose of the DCT-2, DST-2 is a flip and sign change of DCT-2, a sign and flip of DCT-2 results in DCT-2 (i.e., there is no change), DCT-3 (e.g., T$^{(C3)}$) is also a flip and sign change of the transpose of DCT-2, and DST-3 (e.g., T$^{(S3)}$) is a sign change and flip of the transpose of DCT-2. Reading across the second row, DST-6 is a transpose of DST-7, DST-5 is a flip and sign change of DST-7, DCT-8 is a sign change and flip of DST-7, DCT-8 is also a flip and sign change of transpose of DST-7, and DST-5 is a sign change and flip of the transpose of DST-7. Table 1 can read similarly for the last two rows.

Table 1 shows that DST-4 is simply a variant of DCT-4 based on reflection and sign changes, and the inclusion also does not increase the implementation burden. In addition, identity transforms (IDTs) can be used in cases where a single 1-D transformation (vertical or horizontal transform) is sufficient to provide good compression performance.

In some examples, there may be limits on how much permanent memory (e.g., read-only memory (ROM)) on video encoder 200 and video decoder 300 is available. Therefore, some techniques limit the values that can be stored in the permanent memory of video encoder 200 and video decoder 300 to store only the kernels (e.g., basis function values) for DCT-2, DST-7, and DCT-8. For instance, in some other techniques, a balance is achieved where to ensure that permanent memory of video encoder 200 and video decoder 300 is not all used up storing values for transforms (e.g., DCTs and DSTs), only values for a few DCTs and DSTs are stored and used, which impacts the quality of video coding (e.g., other types of DCTs and DSTs may be better suited for video coding but are unavailable due to memory limitations).

However, as shown in Table 1, there are various DCTs and DSTs that can be calculated on-the-fly (e.g., during operation of video encoder 200 and video decoder 300). As an example, video encoder 200 and video decoder 300 may store values of DCT-2 for different block sizes in permanent memory. During operation, if DCT-3 is a better choice for video coding, video encoder 200 and video decoder 300 may generate, on-the-fly, the values for the DCT-3 (e.g., by determining the transpose of DCT-2 for the particular block size). Video encoder 200 and video decoder 300 may store the results of the computations to determine the values for DCT-3 in temporary memory of video encoder 200 and video decoder 300. For instance, video encoder 200 and video decoder 300 may be able to provision sufficient memory space in temporary memory to at least temporarily store the values for DCT-3 to perform the video encoding or decoding operations. After encoding or decoding the current block, if the temporary memory is needed, video encoder 200 and video decoder 300 may clear the temporary memory, but later reuse that same temporary memory space if another DCT or DST is temporarily needed (e.g., not one of DCT-2, DST-7, or DCT-8).

As a result, in one or more examples described in this disclosure, video encoder 200 and video decoder 300 may not be limited to same DCT and DST-types, such as in VVC Draft 5. For instance, rather than being limited to DCT-2, DST-7, and DCT-8, video encoder 200 and video decoder 300 may generate, on-the-fly, values for additional DCT and DST types, such as those of Table 1, and use those DCT and DST types for encoding and decoding.

Accordingly, a transform set may satisfy one or more of the following properties. A separable transform can be obtained by selecting a pair of 1-D transforms (kernels) from the set S={DCT-2, DST-7, DST-8, DCT-3, DST-2, DST-3, DCT-4, DST-4, DST-5, DST-6, IDT}, and multiple transform candidates can be generated by such multiple pairs.

A transform pair can be chosen from S for horizontal and vertical separately. Pre-selection of the transform kernels can be done based on information such as intra-prediction mode, inter-prediction mode, block size, etc. As a result, a look up table for transform kernels can be pre-defined which is indexed by the information mentioned (prediction mode, etc.). Therefore, the number of RD optimization loops will not be increased.

Some examples are provided as follows. If horizontal mode is chosen for intra-prediction, one horizontal 1-D transform can be selected from DST-7 and DST-6 and one vertical 1-D transform can be selected from DST-2 and DCT-3. As a result, there are totally 4 candidates for (horizontal, vertical) combinations including (DST-7, DCT-2), (DST-7, DCT-3), (DST-6, DCT-2), (DST-6, DCT-3), and thus no additional RD optimization loop is needed in addition to the current VVC standard.

For block width (height) smaller or equal to 8, one transform can be chosen from DST-7 and DCT-8 for horizontal (vertical) direction. For block width (height) larger than 8, one transform can be chosen from DST-5 and DCT-3 for horizontal (vertical) direction. The width or height refer to the number of samples horizontally (width) or vertically (height). For certain intra modes (such as horizontal), transform candidates may include IDT so that (horizontal, vertical) transform combinations may include (DST-7, IDT), (DST-6, IDT).

The above examples describe ways in which to extend the transforms that are used. This disclosure also describes examples where different transforms (e.g., kernels) are used for transforming or inverse transforming the same block. For instance, some of the rows or columns of a block may be transformed or inverse transformed using a first transform type, and other rows or columns of the block may be transformed or inverse transformed using a second transform type.

In a transform block of size N×M, instead of applying one horizontal (vertical) transform to all the rows (columns), as for the current standard, up to two transforms $T_1$ and $T_2$ can be applied in horizontal (vertical) direction in a way that $T_1$ is applied on the first n rows (columns) and $T_2$ is applied on the last N−n rows (M−n columns).

Pre-selection of the transform kernels can be done based on information such as intra-prediction mode, inter-prediction mode, block size, etc. As a result, a look up table for transform kernels can be pre-defined which is indexed by the information mentioned (prediction mode, etc.). Therefore, the number of RD optimization loops will not be increased.

Some examples are provided as follows. When diagonal mode for intra-prediction from top left corner is applied, horizontal transform can be chosen from the two sets: $H_1$=(DST-7, DCT-2) and $H_2$=(DCT-3, DCT-2) based on rate distortion optimization. If $H_1$=(DST-7, DCT-2) is chosen for horizontal transform kernels, DST-7 is applied for the first N/2 rows and DCT-2 is applied for the last N/2 rows. For vertical transform, video encoder 200 or video decoder 300 can choose between two sets: $V_1$=(DST-7, DCT-2) and $V_2$=(DST-5, DCT-2). If $V_2$=(DST-5, DCT-2) is chosen, DST-5 is applied on the first M/2 columns, while DCT-2 is applied on the last M/2 columns. As a result, there are totally 4 candidates for (horizontal, vertical) combinations including ($H_1$, $V_1$), ($H_1$, $V_2$), ($H_2$, $V_1$), ($H_2$, $V_2$), and thus no additional RD optimization loop is needed in addition to the current VVC standard.

When inter-prediction is applied for the current block and when the spatial motion vector prediction is used based on the neighboring block on the left, the horizontal transform can be chosen from the two sets: $H_1$=(DCT-8, DST-3) and $H_2$=(DCT-8, DCT-4) based on rate distortion optimization. If $H_1$=(DCT-8, DST-3) is chosen for horizontal transform kernels, DCT-8 is applied for the first N/3 rows and DST-3 is applied for the last (2×N)/3 rows. For vertical transform, video encoder 200 or video decoder 300 can choose between two sets: $V_1$=(DCT-7, DCT-2) and $V_2$=(DST-5, DCT-2). If $V_2$=(DST-5, DCT-2) is chosen, DST-5 is applied on the first M/2 columns, while DCT-2 is applied on the last M/2 columns.

When vertical mode for intra-prediction from a top neighboring block is applied, horizontal transform can be chosen from the two sets: $H_1$=(DST-7, DCT-2) and $H_2$=(DCT-3, DCT-2) based on rate distortion optimization. If $H_1$=(DST-7, DCT-2) is chosen for horizontal transform kernels, DST-7 is applied for the first N/2 rows and DCT-2 is applied for the last N/2 rows. For vertical transform, transform kernels can be chosen between two kernels: IDT and DST-7. When DST-7 is chosen, DST-7 is applied for all the columns.

Figure 6:
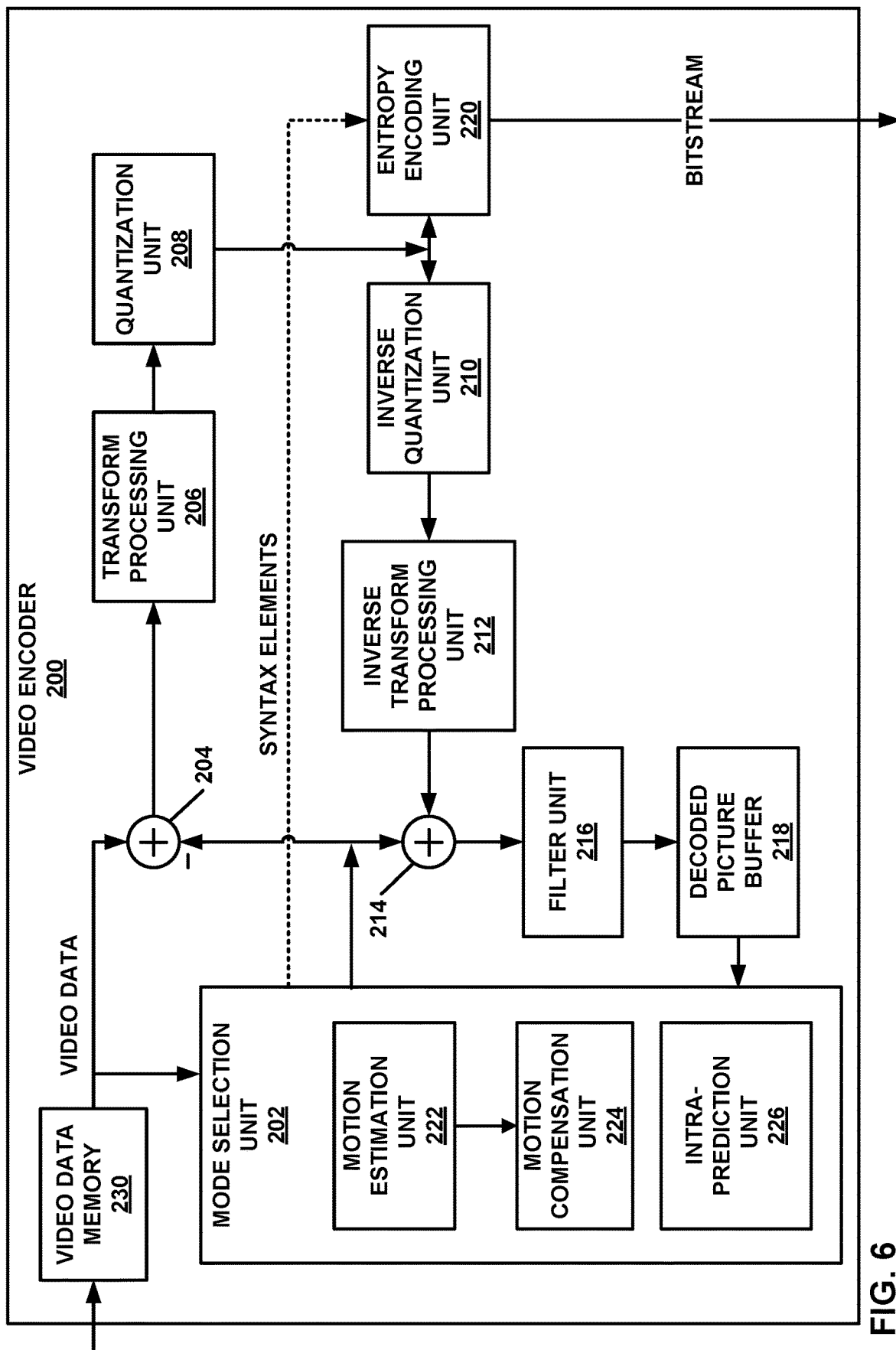
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard, also called versatile video coding (VCC) in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In accordance with one or more examples described in this disclosure, video encoder 200 may be configured to determine one or more transforms to apply from a set of transforms that includes discrete cosine transforms (DCTs) and discrete sine transforms (DSTs), wherein the set of transforms includes DCT-2, DST-7, DST-8, DCT-3, DST-2, DST-3, DCT-4, DST-4, DST-5, DST-6, and an identity transform (IDT). Transform processing unit 206 may be configured to apply the determined one or more transforms to sample values representing a residual block to generate a coefficient block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform example techniques described in this disclosure. For example, video encoder 200 may be configured to determine one or more transforms to apply from a set of transforms that includes discrete cosine transforms (DCTs) and discrete sine transforms (DSTs), where the set of transforms includes DCT-2, DST-7, DST-8, DCT-3, DST-2, DST-3, DCT-4, DST-4, DST-5, DST-6, and an identity transform (IDT), apply the determined one or more transforms to sample values representing residual block to generate a coefficient block, and signal video data indicative of the coefficient block.

As one example, the first group of transform candidates includes (DST-7 and DST-6) based on the one or more characteristics of the current block include that the current block is intra-predicted in horizontal mode. The second group of transform candidates includes (DST-2 and DCT-3) based on the one or more characteristics of the current block include that the current block is intra-predicted in horizontal mode.

As another example, a group of transform candidates includes (DST-7 and DCT-8) based on the one or more characteristics of the current block include that the current block has the width or height less than or equal to 8. As another example, a group of transform candidates includes (DST-5 and DCT-3) based on the one or more characteristics of the current block include that the current block has the width or height greater than 8.

Video encoder 200 also may be configured to generate a coefficient block based on applying two or more transforms to sample values representing a residual block. To apply two or more transforms to the coefficient block, video encoder 200 may be configured to apply a first transform to a first number of rows or columns of a coefficient block, and apply a second transform to a second number of rows or columns of the coefficient block. Video encoder 200 may be configured to signal video data indicative of the coefficient block.

In one or more examples, video encoder 200 may be configured to select a first group of transforms from groups of transforms. As one example, based on a diagonal mode for intra-prediction from top-left corner being applied, for horizontal transform, video encoder 200 may select the first group from the groups of transforms that includes group H1 and group H2, where group H1 includes (DST-7 and DCT-2), and where group H2 includes (DCT-3 and DCT-2). Based on a diagonal mode for intra-prediction from top-left corner being applied, for vertical transform, video encoder 200 may select the first group from the groups of transforms that includes group V1 and group V2, where group V1 includes (DST-7 and DCT-2), and where group V2 includes (DST-5 and DCT-2).

In another example, based on inter-prediction begin applied and the spatial motion vector prediction being used based on the neighboring block on the left, for horizontal transform, video encoder 200 may select the first group from the groups of transforms that includes group H1 and group H2, where group H1 includes (DCT-8 and DST-3), and where group H2 includes (DCT-8 and DCT-4). Based on inter-prediction begin applied and the spatial motion vector prediction being used based on the neighboring block on the left, for vertical transform, video encoder 200 may select the first group from the groups of transforms that includes groups V1 and V2, where group V1 includes (DCT-7 and DCT-2), and where group V2 includes (DST-5 and DCT-2).

In another example, based on vertical mode for intra-prediction from top neighboring block being applied, for horizontal transform, video encoder 200 may select the first group from the groups of transforms that includes group H1 and group H2, where group H1 includes (DST-7 and DCT-2), and where group H2 includes (DCT-3 and DCT-2). Based on vertical mode for intra-prediction from top neighboring block being applied, for vertical transform, video encoder 200 may select the first group from the groups of transforms that includes groups V1 and V2, where group V1 includes (IDT), and where group V2 includes (DST-7).

Figure 7:
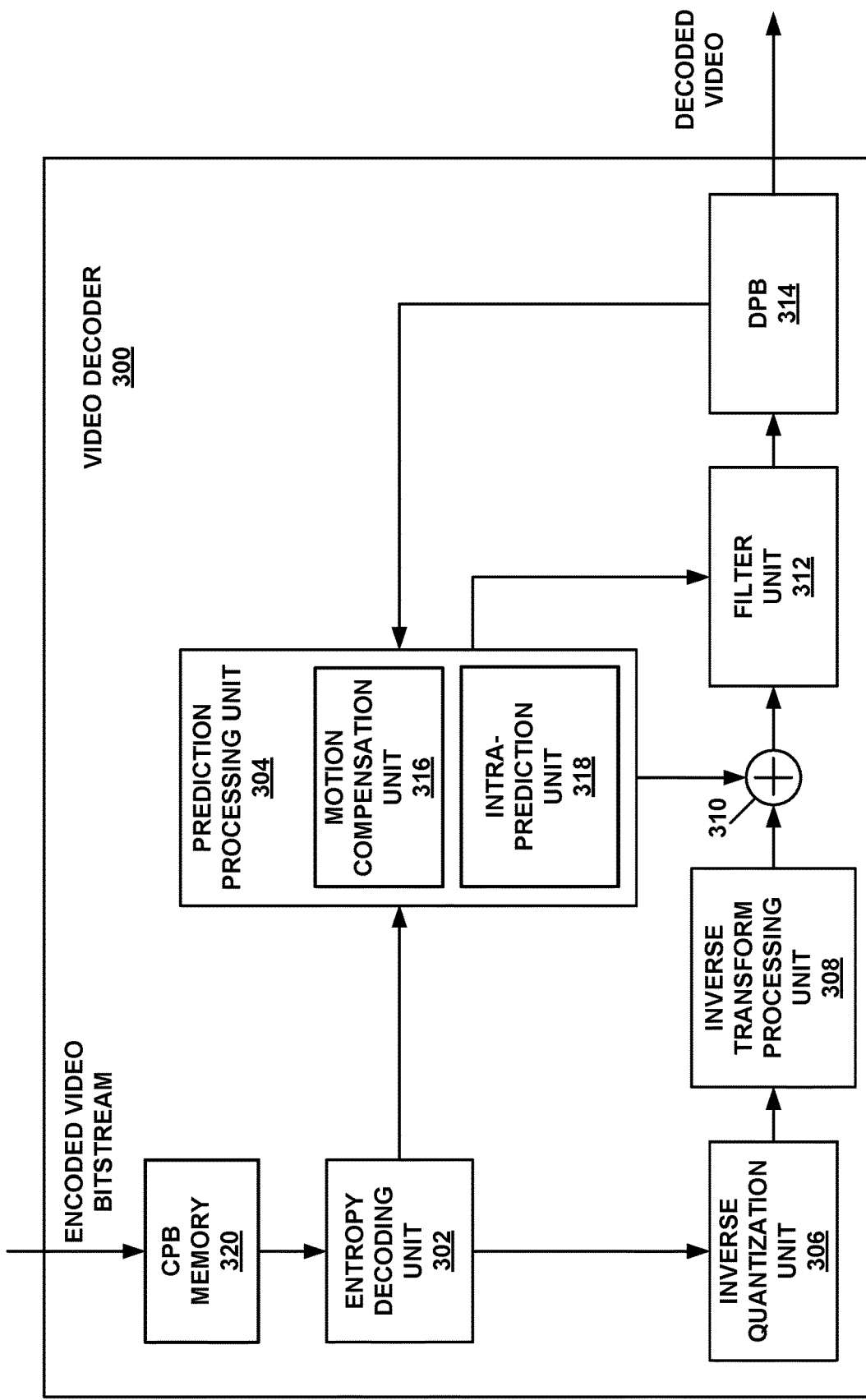
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

In accordance with one or more examples described in this disclosure, video decoder 300 may be configured to determine one or more inverse transforms to apply from a set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT). Inverse quantization unit 306 may be configured to apply the determined one or more inverse transforms to coefficient values representing a residual block to generate the residual block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6).

Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine one or more inverse transforms to apply from a set of inverse transforms that includes inverse discrete cosine transforms (DCTs) and inverse discrete sine transforms (DSTs), where the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT). Video decoder 300 may be configured to apply the determined one or more inverse transforms to coefficient values representing a residual block to generate the residual block, and reconstruct a current block based on the residual block and a predictive block.

As one example, the first group of inverse transform candidates includes (inverse DST-7 and inverse DST-6) based on the one or more characteristics of the current block include that the current block is intra-predicted in horizontal mode. The second group of inverse transform candidates includes (inverse DST-2 and inverse DCT-3) based on the one or more characteristics of the current block include that the current block is intra-predicted in horizontal mode.

As another example, a group of inverse transform candidates includes (inverse DST-7 and inverse DCT-8) based on the one or more characteristics of the current block include that the current block has the width or height less than or equal to 8. As another example, a group of inverse transform candidates includes (inverse DST-5 and inverse DCT-3) based on the one or more characteristics of the current block include that the current block has the width or height greater than 8.

Video decoder 300 may also be configured to generate a residual block based on applying two or more inverse transforms to a coefficient block. To apply two or more inverse transforms to the coefficient block, video decoder 300 may be configured to apply a first inverse transform to a first number of rows or columns of a coefficient block, and apply a second inverse transform to a second number of rows or columns of the coefficient block. Video decoder 300 may be configured to reconstruct a current block based on the residual block and a predictive block.

In one or more examples, video decoder 300 may be configured to select a first group of inverse transforms from groups of inverse transforms. As one example, based on a diagonal mode for intra-prediction from top-left corner being applied, for horizontal transform, video decoder 300 may select the first group from the groups of inverse transforms that includes group H1 and group H2, where group H1 includes (inverse DST-7 and inverse DCT-2), and where group H2 includes (inverse DCT-3 and inverse DCT-2). Based on a diagonal mode for intra-prediction from top-left corner being applied, for vertical transform, video decoder 300 may select the first group from the groups of inverse transforms that includes group V1 and group V2, where group V1 includes (inverse DST-7 and inverse DCT-2), and where group V2 includes (inverse DST-5 and inverse DCT-2).

In another example, based on inter-prediction begin applied and the spatial motion vector prediction being used based on the neighboring block on the left, for horizontal transform, video decoder 300 may select the first group from the groups of inverse transforms that includes group H1 and group H2, where group H1 includes (inverse DCT-8 and inverse DST-3), and where group H2 includes (inverse DCT-8 and inverse DCT-4). Based on inter-prediction begin applied and the spatial motion vector prediction being used based on the neighboring block on the left, for vertical transform, video decoder 300 may select the first group from the groups of inverse transforms that includes groups V1 and V2, where group V1 includes (inverse DCT-7 and inverse DCT-2), and where group V2 includes (inverse DST-5 and inverse DCT-2).

In another example, based on vertical mode for intra-prediction from top neighboring block being applied, for horizontal transform, video decoder 300 may select the first group from the groups of inverse transforms that includes group H1 and group H2, where group H1 includes (inverse DST-7 and inverse DCT-2), and where group H2 includes (inverse DCT-3 and inverse DCT-2). Based on vertical mode for intra-prediction from top neighboring block being applied, for vertical transform, video decoder 300 may select the first group from the groups of inverse transforms that includes groups V1 and V2, where group V1 includes (inverse IDT), and where group V2 includes (inverse DST-7).

Figure 8:
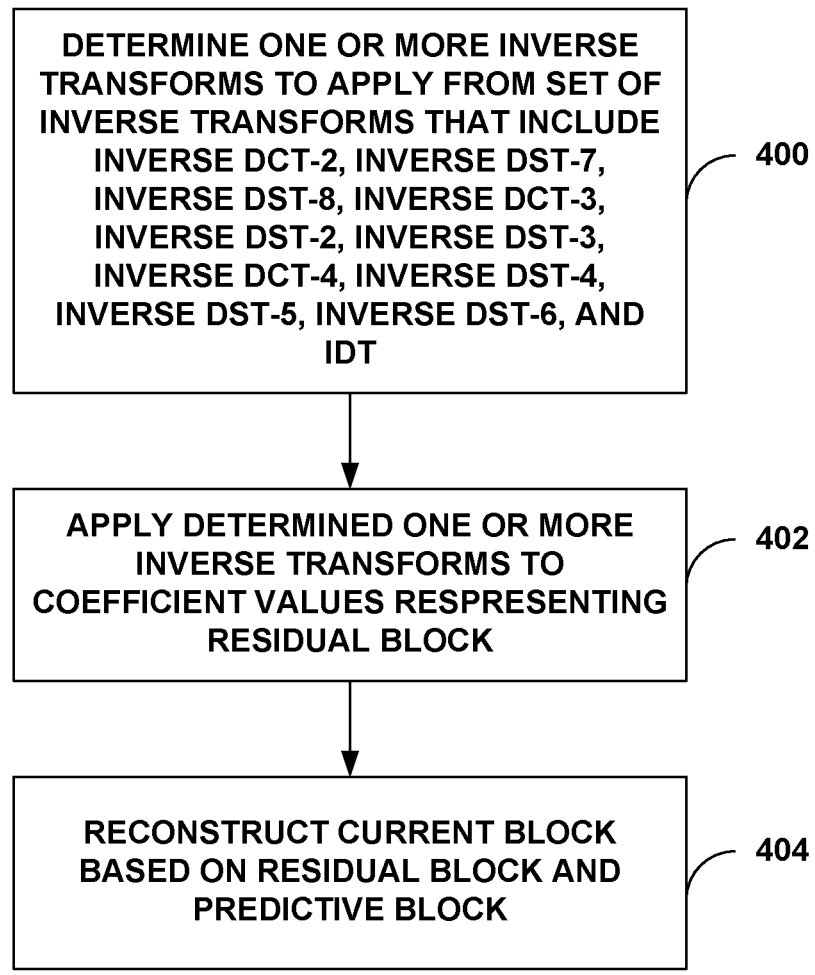
FIG. 8 is a flowchart illustrating an example method of decoding video data in accordance with one or more techniques of this disclosure.

FIG. 8 is a flowchart illustrating an example method of decoding video data in accordance with one or more techniques of this disclosure. In one example, video decoder 300 may determine one or more inverse transforms to apply from a set of inverse transforms that includes inverse discrete cosine transforms (DCTs) and inverse discrete sine transforms (DSTs), where the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT) (400). For example, video decoder 300 may select a pair of 1-D transforms from the set of inverse transforms.

In some examples, video decoder 300 may store a pre-selected group of inverse transform candidates (e.g., DCT-2, DST-7, and DCT-8). Each group of inverse transform candidates includes one or more inverse transforms from the set of inverse transforms, and each group of inverse transform candidates is associated with one or more block characteristics. In such examples, video decoder 300 may select a group of inverse transform candidates based on one or more block characteristics of the current block and determine an inverse transform from the selected group.

Examples of the block characteristics include whether a current block is intra-predicted or whether a width or height of the current block is less than or equal to 8 or greater than 8. For example, video decoder 300 may select a group that includes (inverse DST-7 and inverse DCT-8) based on the one or more characteristics of the current block include that the current block has the width or height less than or equal to 8. In such an example, video decoder 300 may select the inverse transform between inverse DST-7 and inverse DCT-8. As another example, video decoder 300 may select a group that includes (inverse DST-5 and inverse DCT-3) based on the one or more characteristics of the current block include that the current block has the width or height greater than 8. In such an example, video decoder 300 may select the inverse transform between inverse DST-5 and inverse DCT-3.

As described above, in some examples, the group of inverse transform candidates includes a first group from which video decoder 300 determines a first inverse transform. Video decoder 300 may also select a second group of inverse transform candidates based on one or more block characteristics of the current block and determine a second inverse transform. For instance, the first inverse transform may be used to generate an intermediate inverse transformed block, and the second inverse transform may be applied to the intermediate inverse transformed block to generate the residual block.

As one example, video decoder 300 may select a first group that includes (inverse DST-7 and inverse DST-6) based on the one or more characteristics of the current block include that the current block is intra-predicted in horizontal mode, and select the first inverse transform between inverse DST-7 and inverse DST-6. Video decoder 300 may select a second group that includes (inverse DST-2 and inverse DCT-3) based on the one or more characteristics of the current block include that the current block is intra-predicted in horizontal mode, and select the second inverse transform between inverse DST-2 and inverse DCT-3.

Video decoder 300 may apply the determined one or more inverse transforms to coefficient values representing a residual block to generate the residual block (402). For example, video decoder 300 may apply a first inverse transform (e.g., horizontal transform with 1-D transforms row-by-row as illustrated in FIG. 5A) to the coefficient values to generate an intermediate block, and apply a second inverse transform (e.g., vertical transform with 1-D transforms column-by-column as illustrated in FIG. 5B) to the intermediate block to generate the residual block.

Video decoder 300 may reconstruct a current block based on the residual block and a predictive block (404). For example, video decoder 300 may add the residual block to a predictive block to reconstruct the current block.

Figure 9:
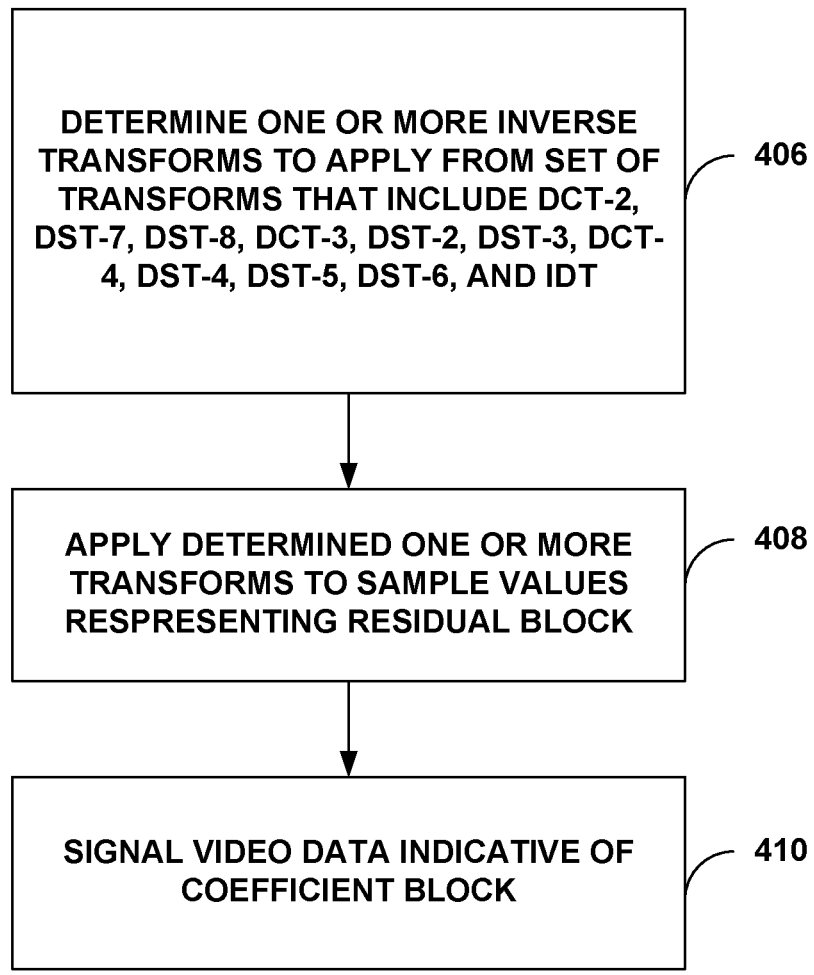
FIG. 9 is a flowchart illustrating an example method of encoding video data in accordance with one or more techniques of this disclosure.

FIG. 9 is a flowchart illustrating an example method of encoding video data in accordance with one or more techniques of this disclosure. In one example, video encoder 200 may determine one or more transforms to apply from a set of inverse transforms that includes discrete cosine transforms (DCTs) and discrete sine transforms (DSTs), where the set of transforms includes DCT-2, DST-7, DST-8, DCT-3, DST-2, DST-3, DCT-4, DST-4, DST-5, DST-6, and an identity transform (IDT) (406). For example, video encoder 200 may select a pair of 1-D transforms from the set of inverse transforms.

In some examples, video encoder 300 may store a pre-selected group of transform candidates (e.g., DCT-2, DST-7, and DCT-8). Each group of transform candidates includes one or more transforms from the set of transforms, and each group of transform candidates is associated with one or more block characteristics. In such examples, video encoder 200 may select a group of transform candidates based on one or more block characteristics of the current block and determine a transform from the selected group.

Examples of the block characteristics include whether a current block is intra-predicted or whether a width or height of the current block is less than or equal to 8 or greater than 8. For example, video encoder 200 may select a group that includes (DST-7 and DCT-8) based on the one or more characteristics of the current block include that the current block has the width or height less than or equal to 8. In such an example, video encoder 200 may select the transform between inverse DST-7 and DCT-8. As another example, video encoder 200 may select a group that includes (DST-5 and DCT-3) based on the one or more characteristics of the current block include that the current block has the width or height greater than 8. In such an example, video encoder 200 may select the transform between DST-5 and DCT-3.

As described above, in some examples, the group of transform candidates includes a first group from which video encoder 200 determines a first transform. Video decoder 300 may also select a second group of transform candidates based on one or more block characteristics of the current block and determine a second transform. For instance, the first transform may be used to generate an intermediate transformed block, and the second transform may be applied to the intermediate transformed block to generate the coefficient block.

As one example, video encoder 200 may select a first group that includes (DST-7 and DST-6) based on the one or more characteristics of the current block include that the current block is intra-predicted in horizontal mode, and select the first transform between DST-7 and DST-6. Video decoder 300 may select a second group that includes (DST-2 and DCT-3) based on the one or more characteristics of the current block include that the current block is intra-predicted in horizontal mode, and select the second transform between DST-2 and DCT-3.

Video encoder 200 may apply the determined one or more inverse transforms to sample values representing a residual block to generate a coefficient block (408). For example, video encoder 200 may apply a first transform (e.g., horizontal transform with 1-D transforms row-by-row as illustrated in FIG. 5A) to the residual values to generate an intermediate block, and apply a second transform (e.g., vertical transform with 1-D transforms column-by-column as illustrated in FIG. 5B) to the intermediate block to generate the coefficient block.

Video encoder 200 may signal video data indicative of the coefficient block (410). For example, video encoder 200 may entropy encode flags and syntax elements that video decoder 300 uses to determine the coefficient block.

Figure 10:
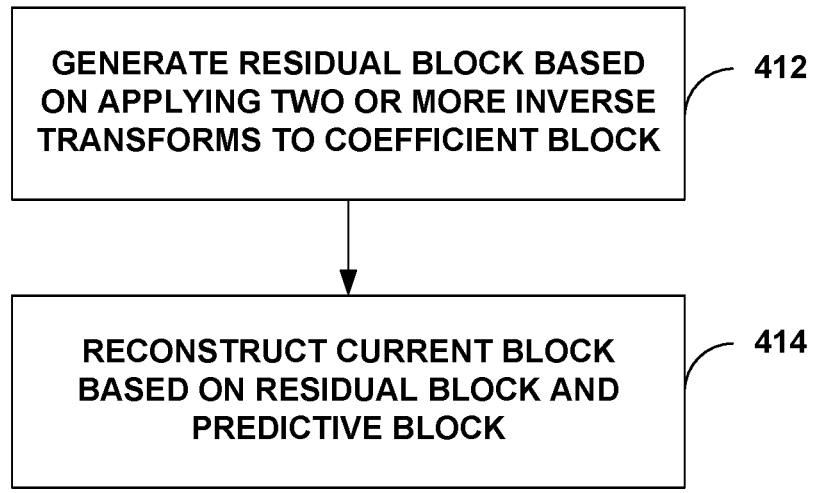
FIG. 10 is a flowchart illustrating another example method of decoding video data in accordance with one or more techniques of this disclosure.

FIG. 10 is a flowchart illustrating another example method of decoding video data in accordance with one or more techniques of this disclosure. Video decoder 300 may generate a residual block based on applying two or more inverse transforms to a coefficient block (412). For example, video decoder 300 may apply a first inverse transform to a first number of rows or columns of a coefficient block and apply a second inverse transform to a second number of rows or columns of the coefficient block.

The first number of rows or columns may be a first n number of rows or columns, where n is an integer greater than or equal to 1. The second number of rows or columns may be a last N−n number of rows or columns, where N is equal to a number of rows or columns of the coefficient block.

In some examples, video decoder 300 may select a first group of inverse transforms from groups of inverse transforms. Video decoder 300 may apply the first inverse transform according to a first inverse transform in the first group of inverse transforms and apply the second inverse transform according to a second inverse transform in the second group of inverse transforms.

In some examples, based on a diagonal mode for intra-prediction from top-left corner being applied, for horizontal transform, video decoder 300 may select the first group from the groups of inverse transforms that includes group H1 and group H2, where group H1 includes (inverse DST-7 and inverse DCT-2), and where group H2 includes (inverse DCT-3 and inverse DCT-2). In some examples, based on a diagonal mode for intra-prediction from top-left corner being applied, for vertical transform, video decoder 300 may select the first group from the groups of inverse transforms that includes group V1 and group V2, where group V1 includes (inverse DST-7 and inverse DCT-2), and where group V2 includes (inverse DST-5 and inverse DCT-2).

In some examples, based on inter-prediction being applied and the spatial motion vector prediction being used based on the neighboring block on the left, for horizontal transform, video decoder 300 may select the first group from the groups of inverse transforms that includes group H1 and group H2, where group H1 includes (inverse DCT-8 and inverse DST-3), and where group H2 includes (inverse DCT-8 and inverse DCT-4). In some examples, based on inter-prediction being applied and the spatial motion vector prediction being used based on the neighboring block on the left, for vertical transform, video decoder 300 may select the first group from the groups of inverse transforms that includes groups V1 and V2, where group V1 includes (inverse DCT-7 and inverse DCT-2), and where group V2 includes (inverse DST-5 and inverse DCT-2).

In some examples, based on vertical mode for intra-prediction from top neighboring block being applied, for horizontal transform, video decoder 300 may select the first group from the groups of inverse transforms that includes group H1 and group H2, where group H1 includes (inverse DST-7 and inverse DCT-2), and where group H2 includes (inverse DCT-3 and inverse DCT-2). In some examples, based on vertical mode for intra-prediction from top neighboring block being applied, for vertical transform, video decoder 300 may select the first group from the groups of inverse transforms that includes groups V1 and V2, where group V1 includes (inverse IDT), and where group V2 includes (inverse DST-7).

Video decoder 300 may reconstruct a current block based on the residual block and a predictive block (414). For example, video decoder 300 may add the residual block to the predictive block to reconstruct the current block.

Figure 11:
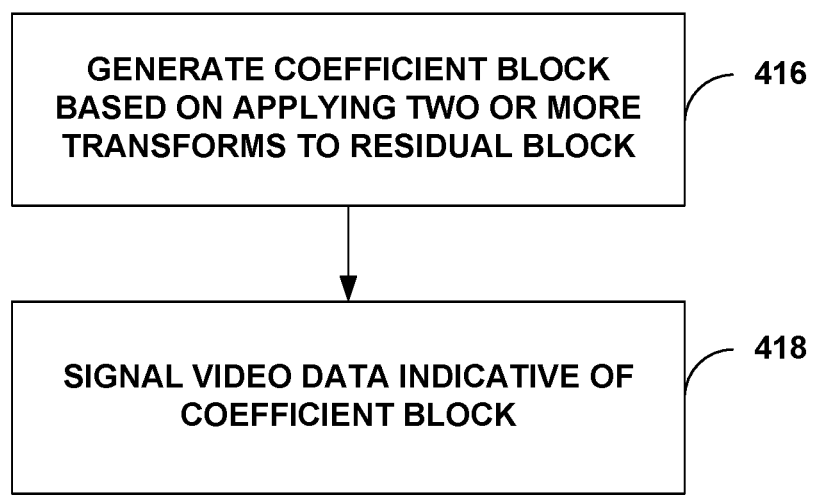
FIG. 11 is a flowchart illustrating another example method of encoding video data in accordance with one or more techniques of this disclosure.

FIG. 11 is a flowchart illustrating another example method of encoding video data in accordance with one or more techniques of this disclosure. Video encoder 200 may generate a coefficient block based on applying two or more transforms to sample values representing a residual block (416). For example, video encoder 200 may apply a first transform to a first number of rows or columns of a coefficient block and apply a second transform to a second number of rows or columns of the coefficient block.

The first number of rows or columns may be a first n number of rows or columns, where n is an integer greater than or equal to 1. The second number of rows or columns may be a last N−n number of rows or columns, where N is equal to a number of rows or columns of the coefficient block.

In some examples, video encoder 200 may select a first group of transforms from groups of transforms. Video encoder 200 may apply the first transform according to a first transform in the first group of transforms and apply the second transform according to a second transform in the second group of transforms.

In some examples, based on a diagonal mode for intra-prediction from top-left corner being applied, for horizontal transform, video encoder 200 may select the first group from the groups of transforms that includes group H1 and group H2, where group H1 includes (DST-7 and DCT-2), and where group H2 includes (DCT-3 and DCT-2). In some examples, based on a diagonal mode for intra-prediction from top-left corner being applied, for vertical transform, video encoder 200 may select the first group from the groups of transforms that includes group V1 and group V2, where group V1 includes (DST-7 and DCT-2), and where group V2 includes (DST-5 and DCT-2).

In some examples, based on inter-prediction being applied and the spatial motion vector prediction being used based on the neighboring block on the left, for horizontal transform, video encoder 200 may select the first group from the groups of transforms that includes group H1 and group H2, where group H1 includes (DCT-8 and DST-3), and where group H2 includes (DCT-8 and DCT-4). In some examples, based on inter-prediction being applied and the spatial motion vector prediction being used based on the neighboring block on the left, for vertical transform, video encoder 200 may select the first group from the groups of transforms that includes groups V1 and V2, where group V1 includes (DCT-7 and DCT-2), and where group V2 includes (DST-5 and DCT-2).

In some examples, based on vertical mode for intra-prediction from top neighboring block being applied, for horizontal transform, video encoder 200 may select the first group from the groups of transforms that includes group H1 and group H2, where group H1 includes (DST-7 and DCT-2), and where group H2 includes (DCT-3 and DCT-2). In some examples, based on vertical mode for intra-prediction from top neighboring block being applied, for vertical transform, video encoder 200 may select the first group from the groups of transforms that includes groups V1 and V2, where group V1 includes (IDT), and where group V2 includes (DST-7).

Video encoder 200 may signal video data indicative of the coefficient block (418). For example, video encoder 200 may entropy encode flags and syntax elements that video decoder 300 uses to determine the coefficient block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    storing groups of inverse transform candidates, wherein each group of inverse transform candidates includes one or more inverse transforms from a set of inverse transforms;
    determining one or more inverse transforms to apply from the set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT), and wherein determining the one or more inverse transforms comprises:
        selecting a first group of inverse transform candidates that includes inverse DST-7 and inverse DST-6 based on a current block being intra-predicted in horizontal mode;
        determining a first inverse transform from between inverse DST-7 and inverse DST-6;
        selecting a second group of inverse transform candidates that includes inverse DST-2 and inverse DCT-3 of inverse transform candidates based on the current block being intra-predicted in horizontal mode; and
        determining a second inverse transform from between inverse DST-2 and inverse DCT-3;
    generating the first inverse transform based on another inverse transform in the set of inverse transforms, wherein generating the first inverse transform comprises:
        retrieving values for the other inverse transform in the set of inverse transforms;
        generating values for the first inverse transform based on the retrieved values; and
        storing the generated values for the first inverse transform;
    applying the first inverse transform based on the stored generated values for the first inverse transform, to coefficient values representing a residual block to generate an intermediate inverse transformed block;
    applying the second inverse transform to the intermediate inverse transformed block to generate the residual block; and
    reconstructing the current block based on the residual block and a predictive block.

2. The method of claim 1, wherein determining the one or more inverse transforms comprises selecting a pair of 1-D transforms from the set of inverse transforms.

3. A method of encoding video data, the method comprising:
    storing groups of transform candidates, wherein each group of transform candidates includes one or more transforms from a set of transforms;
    determining one or more transforms to apply from the set of transforms that includes discrete cosine transforms (DCTs) and discrete sine transforms (DSTs), wherein the set of transforms includes DCT-2, DST-7, DST-8, DCT-3, DST-2, DST-3, DCT-4, DST-4, DST-5, DST-6, and an identity transform (IDT), wherein determining the one or more transforms comprises:
        selecting a first group of transform candidates that includes DST-7 and DST-6 based on a current block being intra-predicted in horizontal mode;
        determining a first transform from between DST-7 and DST-6;
        selecting a second group of transform candidates that includes DST-2 and DCT-3 based on the current block being intra-predicted in horizontal mode; and
        determining a second transform from between DST-2 and DCT-3;

generating the first transform based on another transform in the set of transforms, wherein generating the first transform comprises:
  retrieving values for the other transform in the set of transforms;
  generating values for the first transform based on the retrieved values; and
  storing the generated values for the first transform;
applying the first transform based on the stored generated values for the at least one transform, to sample values representing a residual block of the current block to generate an intermediate transformed block;
applying the second transform to the intermediate transformed block to generate a coefficient block; and
signaling video data indicative of the coefficient block.

4. The method of claim 3, wherein determining the one or more transforms comprises selecting a pair of 1-D transforms from the set of transforms.

5. A device for decoding video data, the device comprising:
  a memory configured to store information for a predictive block and store groups of inverse transform candidates, wherein each group of inverse transform candidates includes one or more inverse transforms from a set of inverse transforms; and
  a video decoder comprising at least one of fixed-function or programmable circuitry, wherein the video decoder is configured to:
    determine one or more inverse transforms to apply from the set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT), and wherein to determine the one or more inverse transforms, the video decoder is configured to:
      select a first group of inverse transforms that includes inverse DST-7 and inverse DST-6 based on a current block being intra-predicted in horizontal mode;
      determine a first inverse transform from between inverse DST-7 and inverse DST-6;
      select a second group of inverse transform candidates that includes inverse DST-2 and inverse DCT-3 based on the current block being intra-predicted in horizontal mode; and
      determine a second inverse transform from between inverse DST-2 and inverse DCT-3;
    generate the first inverse transform based on another inverse transform in the set of inverse transforms, wherein to generate the first inverse transform, the video decoder is configured to:
      retrieve, from the memory, values for the other inverse transform in the set of inverse transforms;
      generate values for the first inverse transform based on the retrieved values; and
      store, to the memory, the generated values for the first inverse transform;
    apply the first inverse transform based on the stored generated values for the first inverse transform, to coefficient values representing a residual block to generate an intermediate inverse transformed block;
    apply the second inverse transform to the intermediate inverse transformed block to generate the residual block; and
    reconstruct the current block based on the residual block and a predictive block.

6. The device of claim 5, wherein to determine the one or more inverse transforms, the video decoder is configured to select a pair of 1-D transforms from the set of inverse transforms.

7. A computer-readable storage medium storing instructions thereon that when executed cause one or more processors of a device for decoding video data to:
  store groups of inverse transform candidates, wherein each group of inverse transform candidates includes one or more inverse transforms from a set of inverse transforms;
  determine one or more inverse transforms to apply from the set of inverse transforms that includes inverse discrete cosine transforms (DCTs) and inverse discrete sine transforms (DSTs), wherein the set of inverse transforms includes inverse DCT-2, inverse DST-7, inverse DST-8, inverse DCT-3, inverse DST-2, inverse DST-3, inverse DCT-4, inverse DST-4, inverse DST-5, inverse DST-6, and an inverse identity transform (IDT), and wherein the instructions that cause the one or more processors to determine the one or more inverse transforms comprise instructions that cause the one or more processors to:
    select a first group of inverse transform candidates that includes inverse DST-7 and inverse DST-6 based on a current block being intra-predicted in horizontal mode;
    determine a first inverse transform from between inverse DST-7 and inverse DST-6;
    select a second group of inverse transform candidates that includes inverse DST-2 and inverse DCT-3 based on the current block being intra-predicted in horizontal mode; and
    determine a second inverse transform from between inverse DST-2 and inverse DCT-3;
  generate the first inverse transform based on another inverse transform in the set of inverse transforms, wherein the instructions that cause the one or more processors to generate the first inverse transform comprise instructions that cause the one or more processors to:
    retrieve values for the other inverse transform in the set of inverse transforms;
    generate values for the first inverse transform based on the retrieved values; and
    store the generated values for the first inverse transform;
  apply the first transform to coefficient values representing a residual block to generate an intermediate inverse transformed block;
  apply the second inverse transform to the intermediate inverse transformed block to generate the residual block; and
  reconstruct the current block based on the residual block and a predictive block.

8. The computer-readable storage medium of claim 7, wherein the instructions that cause the one or more processors to determine the one or more inverse transforms comprise instructions that cause the one or more processors to select a pair of 1-D transforms from the set of inverse transforms.

* * * * *